United States Patent
Hoshino

(10) Patent No.: US 8,794,523 B2
(45) Date of Patent: Aug. 5, 2014

(54) IMAGE PROCESSING APPARATUS, IMAGE RECORDING APPARATUS, IMAGE PROCESSING METHOD, AND RECORDING MEDIUM STORING AN IMAGE PROCESSING PROGRAM

(71) Applicant: Yoshiaki Hoshino, Kanagawa (JP)

(72) Inventor: Yoshiaki Hoshino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/962,117

(22) Filed: Aug. 8, 2013

(65) Prior Publication Data

US 2014/0061311 A1     Mar. 6, 2014

(30) Foreign Application Priority Data

Aug. 29, 2012   (JP) ................................ 2012-188323

(51) Int. Cl.
*G06K 7/14*     (2006.01)

(52) U.S. Cl.
USPC ............. 235/462.08; 235/462.01; 235/462.11

(58) Field of Classification Search
USPC ............................ 235/462.08, 462.01, 462.11
See application file for complete search history.

(56) References Cited

U.S. PATENT DOCUMENTS

| | | | |
|---|---|---|---|
| 5,777,308 A * | 7/1998 | Shimizu et al. | 235/462.11 |
| 2008/0116277 A1* | 5/2008 | Tomita | 235/462.11 |
| 2008/0137147 A1 | 6/2008 | Nakano et al. | |
| 2009/0018881 A1 | 1/2009 | Ito et al. | |
| 2009/0020611 A1* | 1/2009 | Sackett et al. | 235/462.08 |
| 2009/0179934 A1 | 7/2009 | Takagi et al. | |
| 2010/0309243 A1 | 12/2010 | Nakano et al. | |
| 2011/0170142 A1 | 7/2011 | Ito et al. | |
| 2011/0273746 A1 | 11/2011 | Hoshino et al. | |
| 2013/0083334 A1* | 4/2013 | Kataoka et al. | 358/1.2 |

FOREIGN PATENT DOCUMENTS

| | | |
|---|---|---|
| JP | 2006-323446 | 11/2006 |
| JP | 2008-210136 | 9/2008 |
| JP | 2009-176126 | 8/2009 |
| JP | 2009-272667 | 11/2009 |
| JP | 2010-091590 | 4/2010 |

* cited by examiner

*Primary Examiner* — Allyson Trail

(74) *Attorney, Agent, or Firm* — Harness, Dickey & Pierce, P.L.C.

(57) ABSTRACT

In an image processing apparatus, after a rasterizer checks resolution of raster data, if the resolution of the raster data is lower than a predefined resolution, a barcode detector analyzes the raster data and detects a barcode area. If there is a barcode area, a barcode direction determining unit determines barcode direction, and a resolution convertor enhances resolution of the barcode on black planes in a direction perpendicular to the bar direction of the barcode.

10 Claims, 6 Drawing Sheets

FIG. 4A

| INPUT RESOLUTION | RESOLUTION AFTER PROCESSING |
|---|---|
| 300*300dpi | 600*300dpi |
| 600*600dpi | 1200*600dpi |
| 1200*1200dpi | 1200*1200dpi |

* RESOLUTION PERPENDICULAR TO BAR DIRECTION IS SHOWN PRIORLY

FIG. 4B

| BARCODE TYPE | BAR WIDTH | RESOLUTION PROCESSING |
|---|---|---|
| JAN CODE | WIDE | NONE |
| UPC | WIDE | NONE |
| NW-7 | NARROW | ENHANCE RESOLUTION |
| GS1-128 | NARROW | ENHANCE RESOLUTION |

FIG. 4C

| BARCODE TYPE | BAR WIDTH | EDGE PROCESSING |
|---|---|---|
| JAN CODE | WIDE | DELETE DOTS |
| UPC | WIDE | DELETE DOTS |
| NW-7 | NARROW | REPLACE SMALL DOTS |
| GS1-128 | NARROW | REPLACE SMALL DOTS |

WITHOUT
CORRECTION

REPLACE
WITH BLANK

CORRECT ONE DOT

REPLACE
WITH BLANK

CORRECT TWO DOTS

REPLACE WITH
SMALL DOTS

REPLACE RIGHT
EDGE ONLY

REPLACE WITH
SMALL DOTS

REPLACE BOTH
EDGES

REPLACE
WITH BLANK

REPLACE WITH
SMALL DOTS

IMAGE PROCESSING APPARATUS, IMAGE RECORDING APPARATUS, IMAGE PROCESSING METHOD, AND RECORDING MEDIUM STORING AN IMAGE PROCESSING PROGRAM

CROSS-REFERENCE TO RELATED APPLICATION

This patent application is based on and claims priority pursuant to 35 U.S.C. §119 to Japanese Patent Application No. 2012-188323, filed on Aug. 29, 2012 in the Japan Patent Office, the entire disclosure of which is hereby incorporated by reference herein.

BACKGROUND

1. Technical Field

The present invention relates to an image processing apparatus, image recording apparatus, image processing method, and recording medium storing an image processing program.

2. Background Art

Conventionally, GS1-128 (EAN-128) is used as a high-density barcode. The total length of the GS1-128 barcode including quiet zones on both sides needs to be within 60 mm, and the GS1-128 comprises lines of four different widths.

In printing such a barcode at a resolution of 300 dpi, both a white line (hereinafter referred to as a white bar) and a black line (hereinafter referred to as a black bar) are printed with 2 dots (0.169 mm), 4 dots, 6 dots, and 8 dots. In printing such a barcode at a resolution of 600 dpi, both the white bar and the black bar are printed with 4 dots (0.169 mm), 8 dots, 12 dots, and 16 dots. In printing such a barcode at a resolution of 1200 dpi, both the white bar and the black bar are printed with 9 dots (0.190 mm), 18 dots, 27 dots, and 36 dots. However, in this case, the line width is very narrow, and high-precision printing is necessary to make the barcode readable.

To satisfy this kind of requirement, a technology that corrects the barcode width (e.g., JP-2010-091590-A) and a technology that makes increases the resolution in a barcode area (e.g., JP-2009-272667-A) have been proposed.

However, a problem for both these approaches is that, in general, dots formed using an inkjet printer tend to bleed. Therefore, in printing a barcode using an inkjet printer, the amount of ink liquid used for printing each pixel increases at low print resolutions, resulting in more bleeding of the dot. Consequently, the black bar becomes wider than it would be at a higher print resolution, and that makes the barcode unreadable.

In addition, in some cases, the width of black bar is corrected when the barcode is printed by an inkjet printer. The problem is that the correctional unit is itself large since the correction is performed in units of dot. Consequently, the width of a narrow black bar cannot be corrected properly, and that also makes the barcode unreadable.

SUMMARY

The present invention provides an improved image processing apparatus that includes an acquisition unit that acquires image data, a detector that detects a barcode area in the acquired image data in case a first resolution of the image data is not higher than a predefined resolution and detects a bar direction of the barcode in the detected barcode area, and a resolution converter that converts first resolution in the direction perpendicular to the bar direction of the barcode into a second resolution higher than the first resolution.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 4A is a diagram illustrating resolution conversion, FIG. 4B is a diagram illustrating presence or absence of resolution conversion depending on barcode type, and FIG. 4C is a diagram illustrating edge processing depending on barcode type as an embodiment of the present invention.

DETAILED DESCRIPTION

Figure 1A:
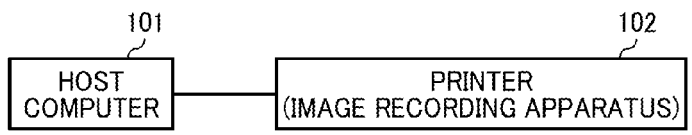
FIG. 1A is a diagram illustrating a configuration of an image processing system.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

In the present invention, after detecting a barcode image area in image data, if it is determined that there is a barcode, the resolution of the black planes is converted into a resolution suitable for barcode printing.

First Embodiment

FIG. 1A is a diagram illustrating a configuration of an image processing system in the first embodiment. The image processing system is comprised of a host computer 101 that acquires input image data from an application and provides output image data to output destination and a printer (an image recording apparatus) 102 that expands the provided output image data and prints it out on a recording medium such as paper. The host computer 101 and the printer 102 are connected with each other via a network.

Figure 1B:
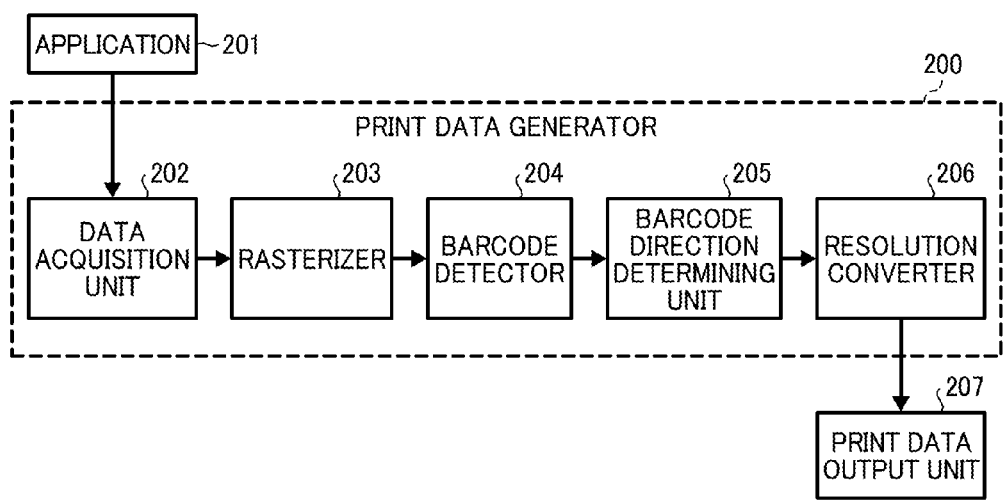
FIG. 1B is a diagram illustrating a configuration of an image processing apparatus as an embodiment of the present invention.

FIG. 1B is a diagram illustrating a configuration of an image processing apparatus in the host computer 101. For example, after receiving a command to output an image, an application 201 outputs image data that includes barcode information to a print data generator 200. The print data generator 200 is comprised of an image data acquisition unit 202, a rasterizer 203, a barcode detector 204, a barcode direction determining unit 205, and a resolution converter 206. The image data acquisition unit 202 acquires the image data. The rasterizer 203 generates raster data in format of being output to the printer. Generally, the raster data is comprised of four types of image data: KCMY. The barcode detector 204 detects a barcode image area from raster data of a page. The barcode direction determining unit 205 determines a direction of the detected barcode. The resolution converter 206 enhances resolution of black planes for output to a print data output unit 207. Subsequently, the print data output unit 207 outputs print data to the printer 102 via the network.

Figure 2A:
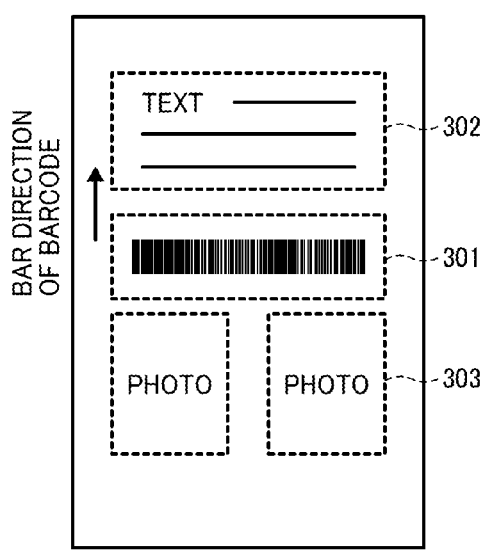
FIGS. 2A and 2B are diagrams illustrating examples of print data that includes a barcode image as an embodiment of the present invention.
Figure 2B:
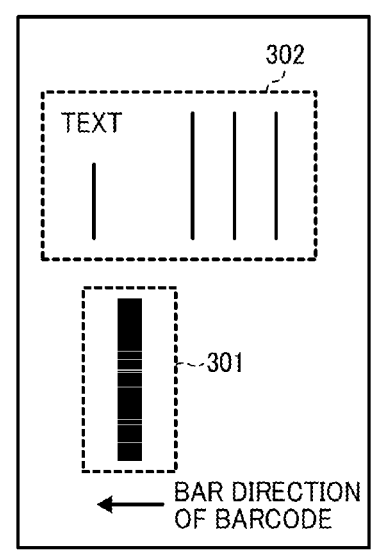

FIGS. 2A and 2B are diagrams illustrating examples of print data that includes a barcode image output by the application 201. In FIGS. 2A and 2B, the image data comprises an area 301 that includes a barcode and areas 302 and 303 that do not include a barcode. Text and photos, etc., are examples of areas that do not include a barcode. In some cases, a barcode is pasted on a document as raster data (an image object) such as a bitmap. The barcode direction (barcode scanning direction) is horizontal in FIG. 3A and vertical in FIG. 3B. Arrows in FIGS. 3A and 3B indicate the bar direction of the barcode.

Figure 3:
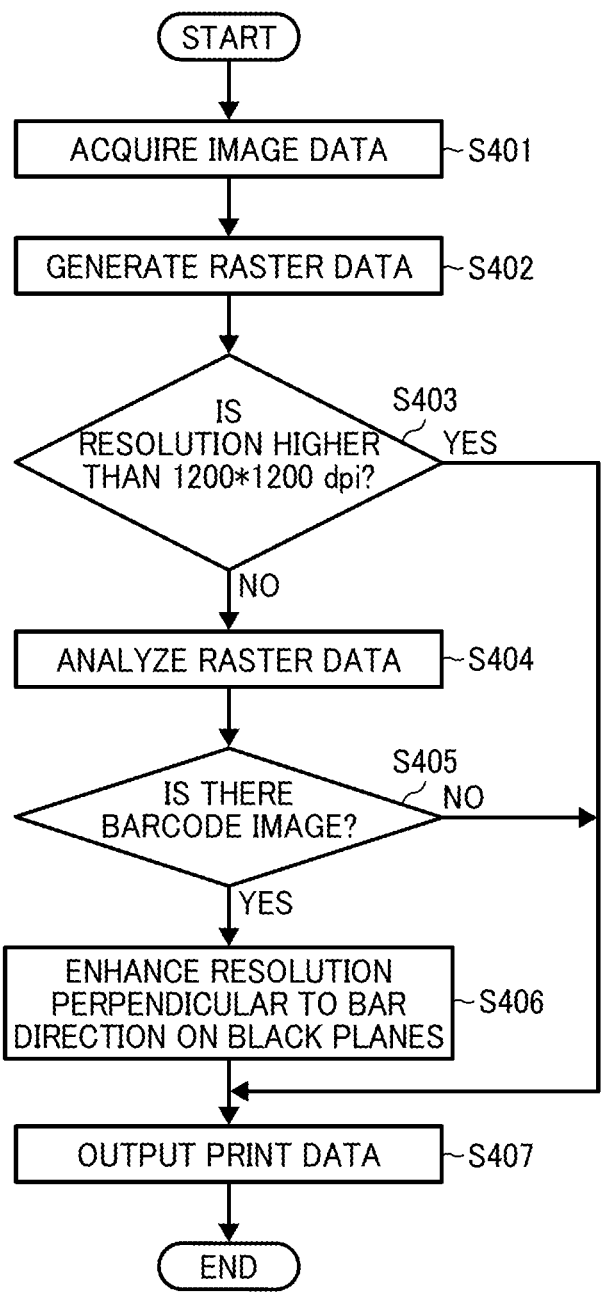
FIG. 3 is a flowchart illustrating a process executed in a first embodiment of the present invention.

FIG. 3 is a flowchart illustrating a process executed by the print data generator, and resolution conversion is performed in the direction perpendicular to the bar direction of the barcode in case the resolution is lower than a predefined value in the process in first embodiment.

After the application 201 outputs image data for a page, the data acquisition unit 202 acquires the image data in S401, and the rasterizer 203 generates raster data in S402. At that point, after the rasterizer 203 checks resolution of the raster data, if the resolution of the raster data is higher than 1200*1200 dpi (YES in S403), print data is output as is in S407. Alternatively, if the resolution of the raster data is lower than 1200*1200 dpi (NO in S403), the barcode detector 204 analyzes the raster data in S404 and detects a barcode area. If there is a barcode area (YES in S405), the barcode direction determining unit 205 determines the barcode direction, and the resolution converter 206 enhances resolution of black planes of the page in the direction perpendicular to bar direction of the barcode in S406. Subsequently, the print data output unit 207 outputs print data in S407. Alternatively, if there is no barcode area (NO in S405), print data is output as is in S407.

Regarding the barcode area detected as described above, the barcode direction determining unit 205 scans pixel data shown in FIG. 2A from left to right on the page. If same pixel repeats more than a predefined number of dots in the pixel data, the barcode direction determining unit 205 determines that the scanning direction is the same as the bar direction. Alternatively, if data appears alternately for from several dots to several dozen dots, the barcode direction determining unit 205 determines that the scanning direction is perpendicular to the bar direction.

FIG. 4A is a diagram illustrating an example of resolution conversion. For example, input resolution 300*300 is converted into resolution 600 (resolution in the direction perpendicular to the bar direction)*300. These numerical values are only examples, and the conversion can be performed in other ways.

As described above, in the first embodiment, it is possible to print a barcode readable with high precision by enhancing resolution in the direction perpendicular to the bar direction of the barcode on black planes on the page whose print data includes the barcode without enhancing resolution in a direction that is unnecessary. Also, unnecessary resolution conversion can be prevented by not performing resolution conversion if the resolution of print data is higher than a predefined resolution.

Second Embodiment

Figure 5:
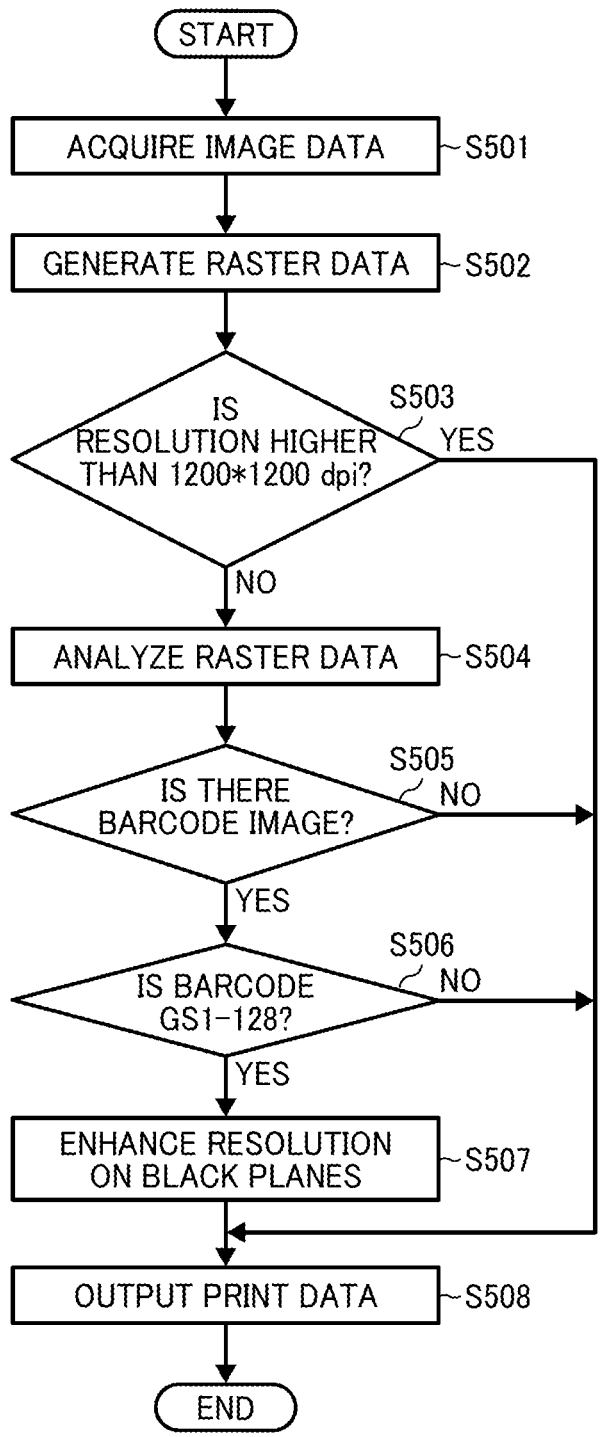
FIG. 5 is a flowchart illustrating a process executed in a second embodiment of the present invention.

FIG. 5 is a flowchart illustrating a process executed in the second embodiment. The process from steps S501 to S505 is the same as in the first embodiment. If there is a barcode area (YES in S505) and the barcode is GS1-128 (YES in S506), resolution of black planes on the page is enhanced in S507, and print data is output in S508.

In the example described above, it is assumed that the type of barcode that needs resolution conversion is GS1-128. However, the type of barcode is not limited to GS1-128, and alternatively other types of barcodes can be used in the present invention. FIG. 4B is a diagram illustrating presence or absence of resolution conversion depending on barcode type. In addition, it is possible to choose whether or not the resolution conversion described above is performed manually; i.e., according to a command from an operator.

As described above, in the second embodiment, it is possible to prevent unnecessary resolution conversion by choosing whether or not to perform the resolution conversion depending on the detected barcode type. In addition, it is possible to choose the resolution conversion process in response to a user operation.

Third Embodiment

Figure 6:
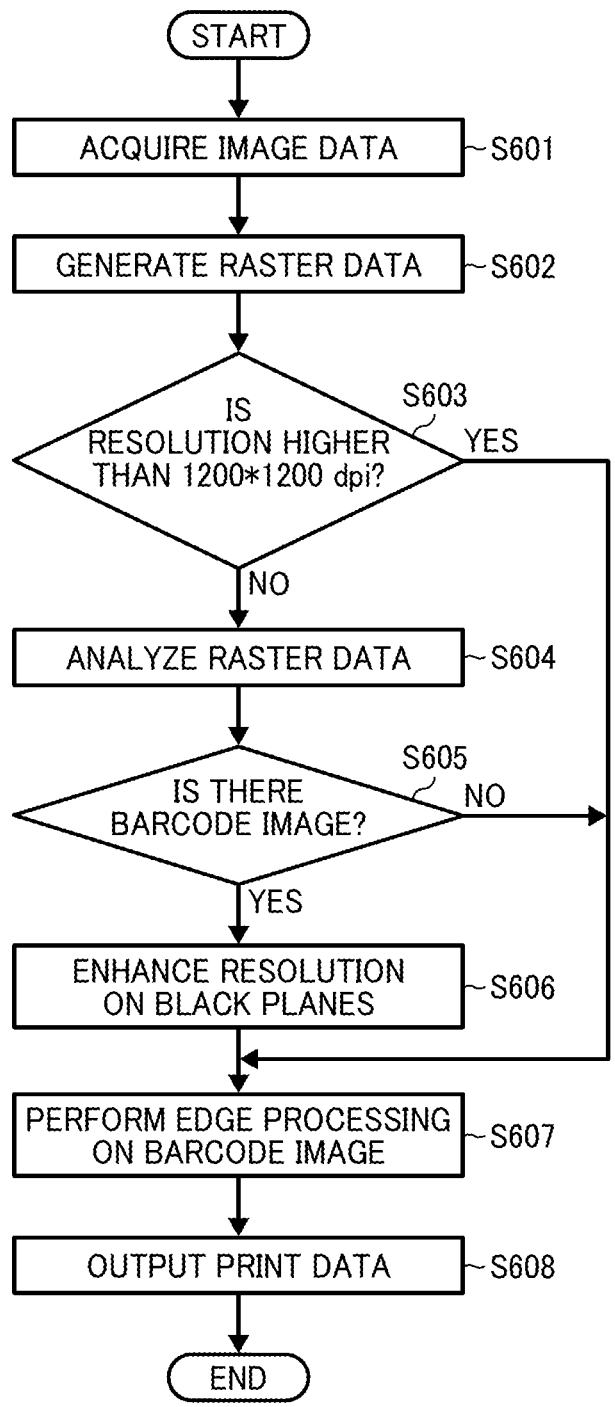
FIG. 6 is a flowchart illustrating a process executed in a third embodiment of the present invention.

In the third embodiment, edge processing is performed on a barcode image on which resolution conversion is performed. FIG. 6 is a flowchart illustrating a process executed in the third embodiment. The process from steps S601 to S606 is the same as in the first embodiment. In the third embodiment, the resolution converter 206 performs the edge processing on the barcode image in S607 and print data is output in S608.

Figure 7A:
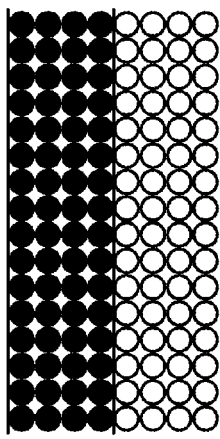
FIGS. 7A, 7B, 7C, 7D, 7E, and 7F are diagrams illustrating an example of edge processing as an embodiment of the present invention.

FIGS. 7A, 7B, 7C, 7D, 7E, and 7F are diagrams illustrating an example of the edge processing. As shown in FIG. 7A, an example of the edge processing performed on a black bar whose width is four dots after resolution conversion is described below.

Figure 7B:
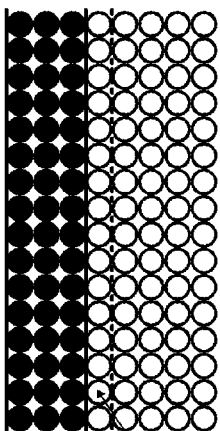
Figure 7C:
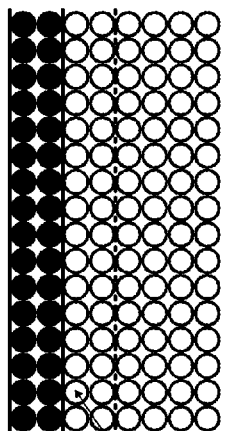

One edge processing that corrects the width of the black bar replaces a dot with a blank dot. As shown in FIG. 7B, in correcting one dot, the black bar is narrowed by replacing one dot on the right edge with the blank dot. Similarly, as shown in FIG. 7C, in correcting two dots, the black bar is narrowed by replacing two dots on the right edge with the blank dots. Alternatively, dots on the left edge can be replaced instead of dots on the right edge. Also, in correcting two dots, one dot on both edges can be replaced.

Figure 7D:
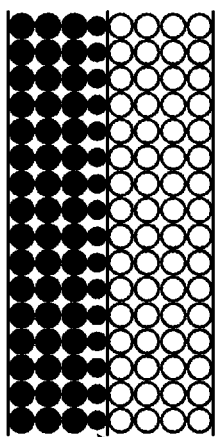
Figure 7E:
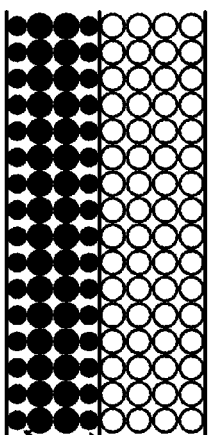

As another correction method, as shown in FIG. 7D, it is possible to prevent bleeding and make the black bar narrower by reducing the size of the dots on the right edge of the black bar. Also, as shown in FIG. 7E, it is possible to prevent bleeding on both edges and make the black bar narrow by reducing the size of the dots on both edges.

Figure 7F:
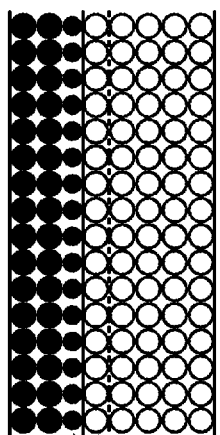

As yet another correction method, as shown in FIG. 7F, in combination with the two types of correction shown in FIGS. 7B and 7D described above, it is possible to replace the dots on the right edge of the black bar with blank dots and further replace the dots on the right edge of the black bar with small dots, to correct the width of the black bar of the barcode.

The type of edge processing performed on the barcode image described above may be varied depending on the type of the barcode. For example, in the case of GS1-128, whose bar width is very thin, the dot size on the right edge of the black bar becomes small as shown in FIG. 7D in order to correct the thin bar width. Alternatively, in the case of JAN code, whose black bar width is relatively thick, one dot on the right edge is replaced with the blank dot as shown in FIG. 7B. FIG. 4C is a diagram illustrating an edge processing depending on the barcode type.

It is possible to correct the black bar of the barcode described above with black ink and make the background of the barcode blank. Also, it is possible to change barcode processing in response to user operation.

As described above, in the third embodiment, by enhancing the resolution of black planes on the page that include barcode in the print data and further performing edge processing on the detected barcode image, it is possible to print barcode readable with high precision. Also, by performing the edge processing that changes the number of dots that comprise the black bar and the white bar, the edge processing that changes the size of the dots on the edge area of the black bar, and the edge processing that changes the number of dots that comprise the black bar and the white bar and changes the size of the dots on the edge area of the black bar on the detected barcode image, it is possible to print barcode readable with high precision. In addition, it is possible to change the type of edge processing depending on the detected barcode type, to provide barcode correction suitable to the barcode type. Furthermore, by printing the detected barcode image in black and not printing the background part, it is possible to print barcode readable with high precision. Moreover, it is possible to change the image processing on the detected barcode image in response to user operation.

In the embodiments described above, the present invention is applied to an image processing system that includes the printer (the image recording apparatus). However, the present invention is also applicable to a facsimile apparatus, a plotter apparatus, a copier, and a multiple functional peripheral (MFP).

The present invention provides the image processing apparatus that prints a barcode readable with high precision by converting a resolution of a document into a resolution suitable for barcode printing.

The present invention can also be implemented by providing a storage medium storing software program code that implements functions of the embodiment described above to a system or an apparatus and reading and executing the program code stored in the storage medium by a computer (a CPU or MPU) in the system or apparatus. In this case, the program code read from the storage medium itself implements functions in the embodiment described above. A hard disk, an optical disk, a magneto-optical disk, a nonvolatile memory card, and a ROM can be used as the storage medium to provide the program code. The present invention includes not only implementing functions in the embodiment described above by executing the read program code by the computer but also implementing functions of the embodiment described above by executing part or all of the above-described processes by an Operating System (OS) run on the computer based on the program code. Furthermore, after the program code read from the storage medium is written in memory included in a function expansion board inserted into the computer or a function expansion unit connected to the computer, the CPU in the function expansion board or the function expansion unit executing a part or all of an actual process based on commands of the program code and implements functions in the embodiment described above by the process is also included within the present invention. The program that implements functions of the embodiment can be provided from a server via a communication network.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

What is claimed is:

1. An image processing apparatus, comprising:
an acquisition unit to acquire image data;
a detector to detect a barcode area in the acquired image data in case a first resolution of the image data is not higher than a set resolution and to detect a bar direction of a barcode in the detected barcode area; and
a resolution converter to convert the first resolution of the image data in a direction perpendicular to the bar direction of the barcode into a second resolution higher than the first resolution.

2. The image processing apparatus according to claim 1, wherein the resolution converter is configured to determine whether or not resolution conversion is performed depending on barcode type in the barcode area.

3. The image processing apparatus according to claim 1, further comprising:
an edge processing unit that performs edge processing on the barcode area.

4. The image processing apparatus according to claim 3, wherein the edge processing unit is configured to change a number of dots that comprise a black line and a white line in the barcode area.

5. The image processing apparatus according to claim 3, wherein the edge processing unit is configured to change a size of dots in edge part of a black line in the barcode area.

6. The image processing apparatus according to claim 3, wherein the edge processing unit is configured to change a number of dots that comprise a black line and a white line in the barcode area and a size of dots in edge part of a black line in the barcode area.

7. The image processing apparatus according to claim 3, wherein the edge processing unit is configured to choose either edge processing that changes a number of dots that comprise a black line and a white line in the barcode area or edge processing that changes a size of the dots.

8. An image recording apparatus, comprising:
the image processing apparatus according to claim 1.

9. A method of processing an image, comprising:
acquiring image data;
detecting a barcode area in the acquired image data in case a first resolution of the image data is not higher than a set resolution and to detect a bar direction of a barcode in the detected barcode area; and
converting the first resolution of the image data in a direction perpendicular to the bar direction of the barcode into a second resolution higher than the first resolution.

10. A non-transitory recording medium storing a program that, when executed by a computer, causes the computer to implement a method of processing an image,
the method comprising the steps of:
acquiring image data;
detecting a barcode area in the acquired image data in case a first resolution of the image data is not higher than a set resolution and to detect a bar direction of a barcode in the detected barcode area; and converting the first resolution of the image data in a direction perpendicular to the bar direction of the barcode into a second resolution higher than the first resolution.

* * * * *